United States Patent
Hohn et al.

(10) Patent No.: US 11,181,116 B2
(45) Date of Patent: Nov. 23, 2021

(54) INLET SHROUDS FOR FANS USED PRINCIPALLY IN WATER-CIRCULATION PUMPS OF SWIMMING POOLS AND SPAS

(71) Applicant: Zodiac Pool Systems LLC, Vista, CA (US)

(72) Inventors: James Hohn, San Diego, CA (US); Dustin Borg, Poway, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 11 days.

(21) Appl. No.: 16/219,542

(22) Filed: Dec. 13, 2018

(65) Prior Publication Data

US 2019/0186500 A1 Jun. 20, 2019

Related U.S. Application Data

(60) Provisional application No. 62/599,049, filed on Dec. 15, 2017.

(51) Int. Cl.
| | |
|---|---|
| *F04D 25/08* | (2006.01) |
| *F04D 29/14* | (2006.01) |
| *F04D 29/58* | (2006.01) |
| *F04D 29/44* | (2006.01) |
| *H02K 5/20* | (2006.01) |

(Continued)

(52) U.S. Cl.
CPC ........... *F04D 25/082* (2013.01); *F04D 13/06* (2013.01); *F04D 29/4226* (2013.01); *F04D 29/4293* (2013.01); *F04D 29/441* (2013.01); *F04D 29/5806* (2013.01); *F04D 29/588* (2013.01); *H02K 5/20* (2013.01); *H02K 9/06* (2013.01)

(58) Field of Classification Search
CPC ............. F04D 29/4293; F04D 29/5806; F04D 29/588; F04D 29/441; F04D 13/06; F04D 25/082; F04D 29/4226; F04D 17/16; H02K 5/20; H02K 9/06; F04B 39/066
USPC ....... 417/366; 415/121.1, 121.2; 310/62, 89, 310/63
See application file for complete search history.

(56) References Cited

U.S. PATENT DOCUMENTS 1,896,749 A * 2/1933 Laffoon ................... H02K 9/06
 415/188
1,960,324 A * 5/1934 Van Deventer .......... H02K 7/11
 310/78

(Continued)

FOREIGN PATENT DOCUMENTS

GB 1077890 8/1967

OTHER PUBLICATIONS

PCT/US2018/065513, "International Search Report and Written Opinion", dated Mar. 20, 2019, 12 pages.

*Primary Examiner* — Charles G Freay
(74) *Attorney, Agent, or Firm* — Kilpatrick Townsend & Stockton LLP

(57) ABSTRACT

Motor housings and shrouds are detailed. Inlets of the shrouds may be included on any or all portions of their peripheries (as well as on rears of shrouds if desired). Air hence need not necessarily be drawn wholly linearly into the shrouds, permitting the shrouds to abut, or at least be closely proximate, other objects without materially diminishing air flow into the shrouds. Moreover, plates within the shrouds may be positioned so as to create torturous paths through which the air must travel. Channeling air through these torturous paths helps reduce noise as the air moves to the fans.

11 Claims, 7 Drawing Sheets

(51) Int. Cl.
*H02K 9/06* (2006.01)
*F04D 13/06* (2006.01)
*F04D 29/42* (2006.01)

(56) References Cited

U.S. PATENT DOCUMENTS

| | | | | |
|---|---|---|---|---|
| 2,778,958 A * | 1/1957 | Hamm | ............... | H02K 9/08 310/57 |
| 3,250,926 A * | 5/1966 | O'Reilly | ............... | H02K 9/06 310/60 R |
| 3,407,739 A * | 10/1968 | Myers | ............... | F04D 13/08 417/423.14 |
| 3,610,975 A * | 10/1971 | Onjanow | ............... | H02K 9/18 310/57 |
| 3,749,953 A * | 7/1973 | Baumann | ............... | H02K 9/06 310/62 |
| 4,086,507 A * | 4/1978 | Roland | ............... | H02K 5/10 310/88 |
| 4,767,286 A * | 8/1988 | Kohl | ............... | F04D 29/426 310/63 |
| 5,156,535 A | 10/1992 | Budris et al. | | |
| 5,311,090 A * | 5/1994 | Ferlatte | ............... | H02K 5/10 310/88 |
| 5,343,101 A * | 8/1994 | Matani | ............... | H02K 9/06 310/58 |
| 5,977,667 A * | 11/1999 | Hirose | ............... | F02B 63/04 290/1 B |
| 6,069,423 A * | 5/2000 | Miller | ............... | H02K 9/06 310/51 |
| 6,398,512 B2 * | 6/2002 | Stewart | ............... | F04D 25/082 417/53 |
| 6,464,471 B1 * | 10/2002 | Mathis | ............... | F04D 13/06 417/350 |
| 8,487,490 B2 * | 7/2013 | Dutau | ............... | H02K 9/06 310/63 |
| 8,519,582 B2 * | 8/2013 | Leung | ............... | H02K 9/06 310/62 |
| 2001/0038794 A1 * | 11/2001 | Stewart | ............... | F23L 17/005 417/53 |
| 2009/0092499 A1 * | 4/2009 | Barker | ............... | F04D 29/667 416/247 R |
| 2009/0297373 A1 * | 12/2009 | Xingcan | ............... | F04D 25/082 417/423.8 |
| 2011/0158828 A1 | 6/2011 | Nutz et al. | | |
| 2011/0217193 A1 * | 9/2011 | Wang | ............... | F04D 13/08 417/423.3 |
| 2014/0069432 A1 * | 3/2014 | Mebasser | ............... | F04D 17/16 128/205.25 |
| 2014/0119892 A1 * | 5/2014 | Mornan | ............... | F04D 17/06 415/122.1 |
| 2017/0082120 A1 * | 3/2017 | Badafem | ............... | F04D 29/586 |

* cited by examiner

INLET SHROUDS FOR FANS USED PRINCIPALLY IN WATER-CIRCULATION PUMPS OF SWIMMING POOLS AND SPAS

CROSS-REFERENCE TO RELATED APPLICATION

This application claims the benefit of and priority to U.S. Provisional Patent Application Ser. No. 62/599,049, filed Dec. 15, 2017, and having the same title as appears above (the "Provisional Application"), the entire contents of which Provisional Application are hereby incorporated herein by this reference.

FIELD OF THE INVENTION

This invention relates to air inlets for motor-containing devices (such as, but not limited to, housings connected to pumps) and more particularly, although not necessarily exclusively, to shrouds through which air may be drawn by cooling fans associated with the motors.

BACKGROUND OF THE INVENTION

U.S. Pat. No. 5,156,535 to Budris, et al., whose contents are incorporated herein by this reference, describes a pump for a spa. The pump includes both a motor and a fan designed "to draw ambient air into the motor housing, through the stator laminations, over the field coils, armature, commutator and brushes, while providing sufficient air currents to also cool the motor bearings." See Budris, col. 2, 11. 59-66. The fan appears toward the right side (the "dry end") of the pump in FIG. 1 of the Budris application. Further to the right side of the pump are a bearing, a compartment in which a circuit board is mounted, a back plate, and heat-transfer fins. See id., FIG. 1; col. 4, 1. 67 to col. 5, 1. 17.

No air inlet associated with the fan is expressly identified in the Budris patent. Clear, however, is that any shroud containing such inlet would be a considerable linear distance from the fan due to the components positioned to the right of the fan in FIG. 1. Consequently, substantial clearance must be provided at the right side of the pump of the Budris patent to allow adequate space for both these components and for flow of to-be-ingested air. If inadequate space is available for air ingestion, the motor fan of the pump will not be useful.

SUMMARY OF THE INVENTION

The present invention provides a different motor housing design requiring substantially less clearance than do motor housings of pumps similar to that of the Budris patent. In particular, inlets may be included on peripheries of shrouds of the invention (as well as on the rears of the shrouds if desired). Consequently, air need not necessarily be drawn wholly linearly into the shroud, as from the right of the pump in FIG. 1 of the Budris patent. This allows the innovative motor housings to have their shrouds abut, or at least be closely proximate, other objects, without materially diminishing air flow into the shrouds.

Motor housings of the invention additionally may include vanes or plates within their shrouds. The plates may be positioned so as to reduce, if not eliminate, any significant linear flow of the drawn air through a shroud, instead creating torturous paths through which the air must travel. Channeling air through these torturous paths helps reduce noise as the air moves to the fans. The inventive devices are especially useful as part of pumps of water-circulation systems of swimming pools or spas, although their uses are not limited to these types of objects or systems.

It thus is an optional, non-exclusive object of the present invention to provide motor housings requiring substantially less clearance than conventional housings.

It also is an optional, non-exclusive object of the present invention to provide motor housings whose shrouds include air inlets in their peripheries, which may include some or all of their sides, tops, and bottoms.

It is another optional, non-exclusive object of the present invention to provide motor housings in which air is not necessarily drawn linearly into shrouds.

It is, moreover, an optional, non-exclusive object of the present invention to provide motor housings which may be positioned for use in locations in which shrouds abut, or are adjacent, other objects.

It is a further optional, non-exclusive object of the present invention to provide motor housings including means within their shrouds for creating torturous paths through which entering air must travel.

It is an additional optional, non-exclusive object of the present invention to provide motor housings useful as part of water-circulation systems of swimming pools or spas.

Other objects, features, and advantages of the present invention will be apparent to persons skilled in the relevant art with reference to the remaining text and the drawings of this application.

DETAILED DESCRIPTION

Figure 1:
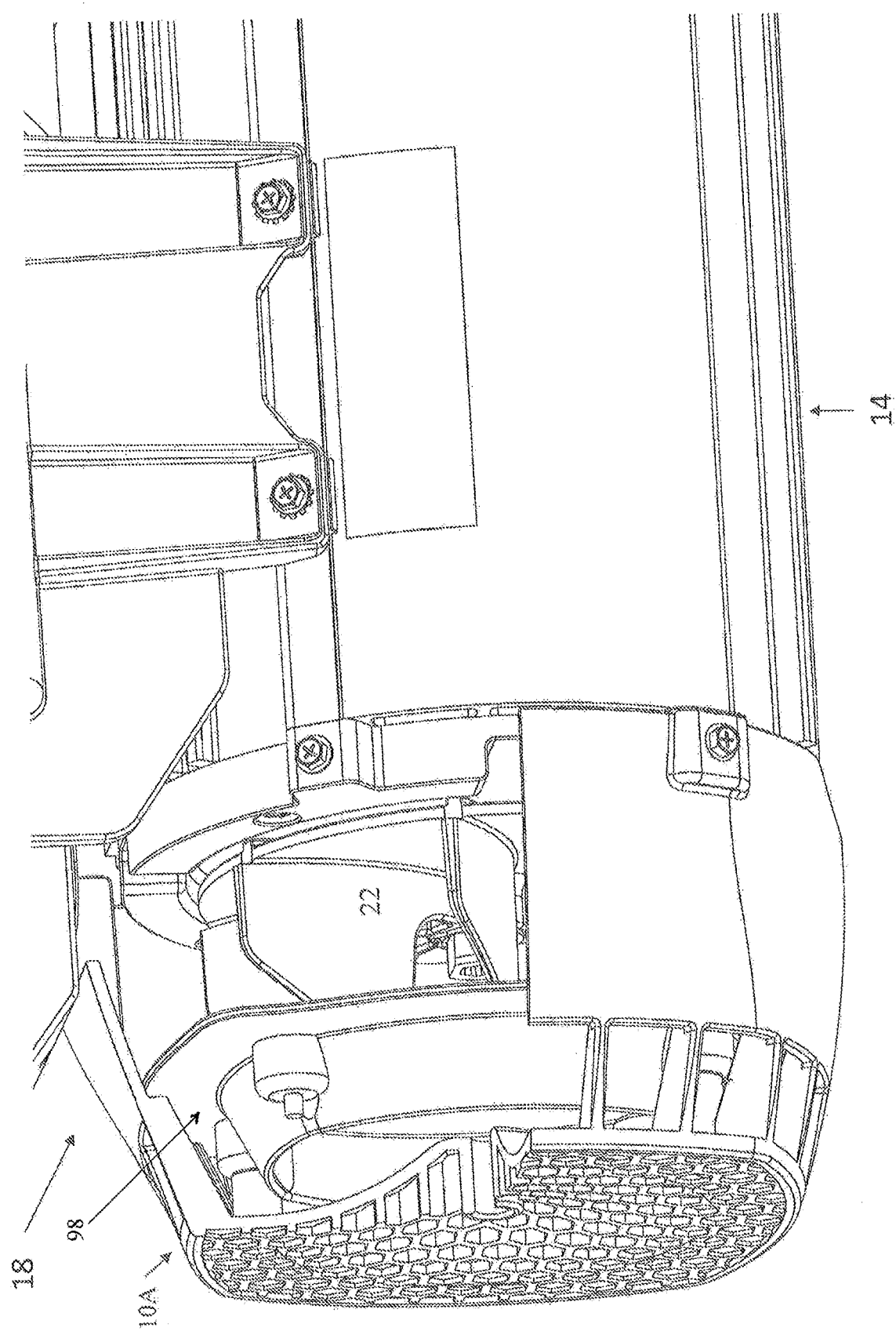
FIG. 1 is a side elevational, partially cut-away view of a motor housing consistent with the present invention.

FIG. 1 illustrates an exemplary shroud 10A forming part of housing 14, which may—but need not necessarily—be connected to or form part of pump 18. Housing 14 contains both a motor and an associated cooling fan 22, with fan 22 preferably positioned within shroud 10. FIG. 1 depicts housing 14 with part of shroud 10A removed so as to show the positioning of fan 22 within the shroud 10A.

Figure 2:
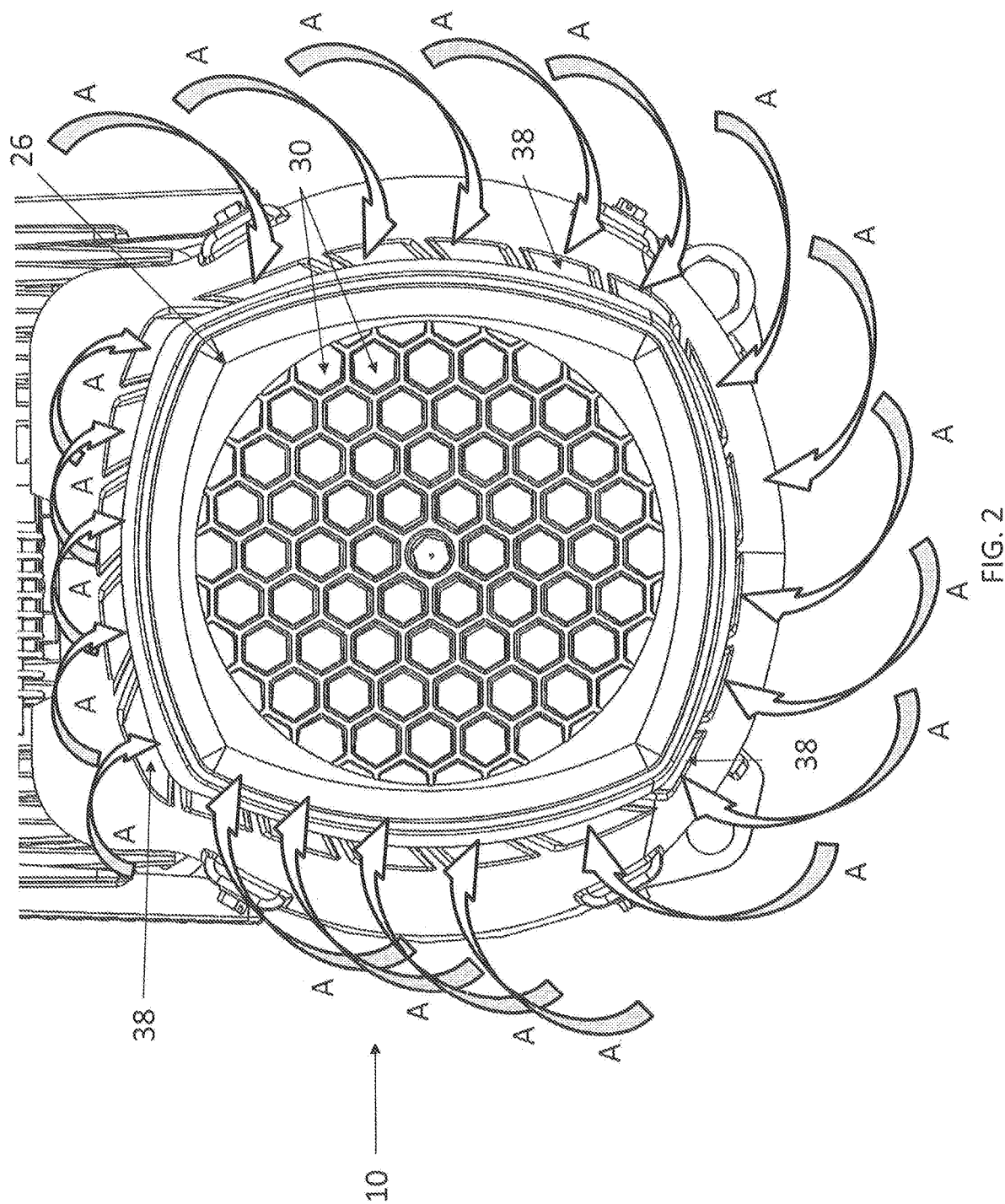
FIG. 2 is a rear elevational view of a housing at least somewhat similar to that of FIG. 1.
Figure 6:
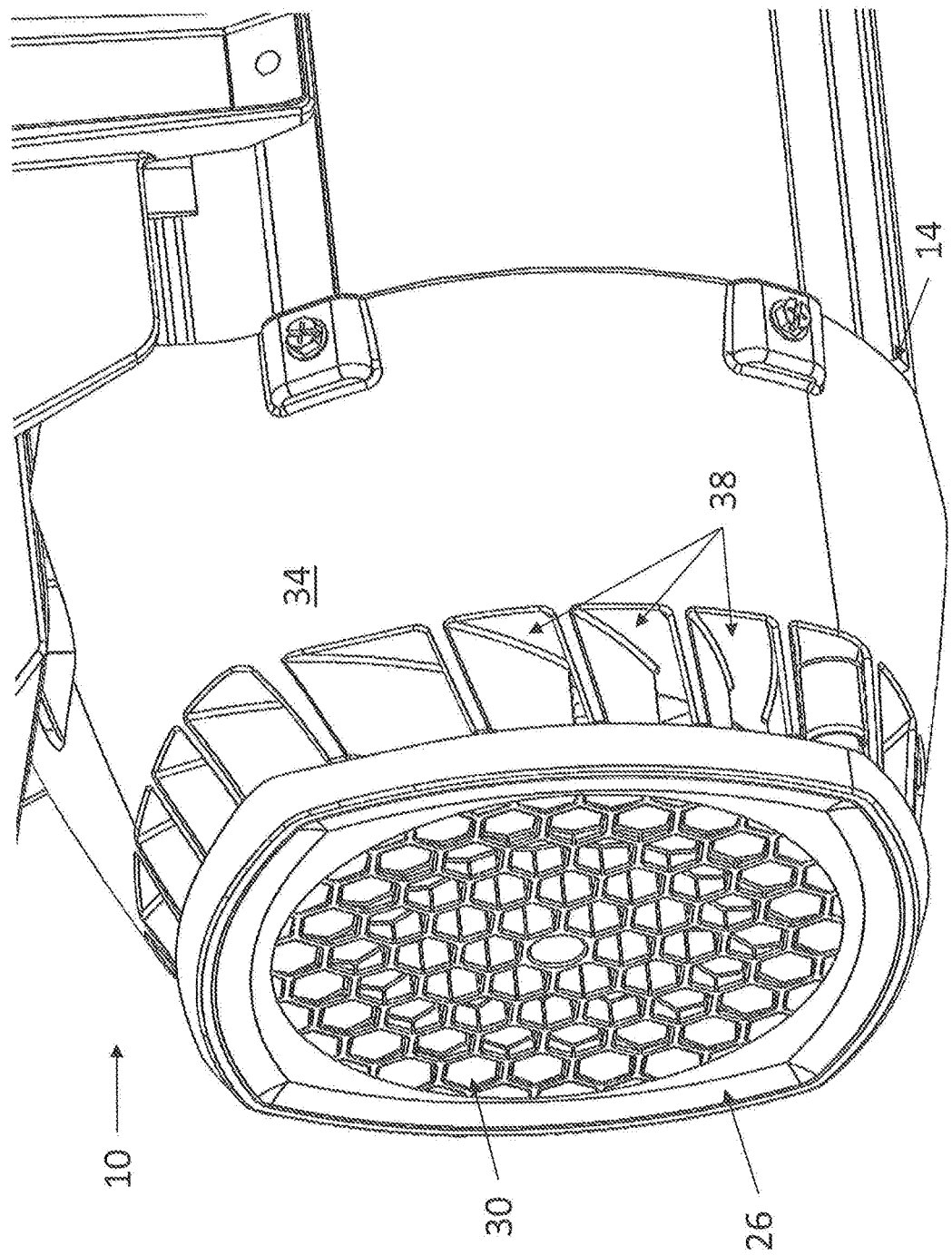
FIG. 6 is a rear perspective view of the housing of FIG. 1.

FIG. 2 provides an elevational, rear view of an alternate shroud 10 and FIG. 6 provides a perspective view of the shroud 10. The shroud 10 includes sides 34 and an end 11, and the end 11 includes a rear surface 26. As is conventional, shroud 10 may—if desired—include open areas in its rear surface 26. Such open areas function as inlets 30 for air drawn into shroud 10 by operation of fan 22. However, in the present invention inlets 30 are not necessary for satisfactory function of pump 18. This is because sides 34 of shroud 10 (see FIG. 6) also include openings forming inlets 38 for air drawn into shroud 10 by operation of fan 22. Using arrows A, FIG. 2 illustrates air flow into inlets 38.

As shown in FIG. 2, inlets 38 may, if desired, extend all about a periphery of shroud 10 formed by sides 34 (thus being present at the "top" and "bottom" of shroud 10 too, although shroud 10 need not necessarily have discernable sides and may be shaped in any suitable manner). Alternatively, inlets 38 may extend less than completely about the periphery. In any event, because of the presence of inlets 38, rear surface 26 may be placed proximate, or even abut, a wall or other solid object without fear of unduly impeding air flow into shroud 10. Indeed, rear surface 26 preferably does not contain open areas (except for a single center opening through which a tool may be inserted), as closing all or a substantial part of rear surface 26 helps reduce noise during operation of the pump.

Figure 3:
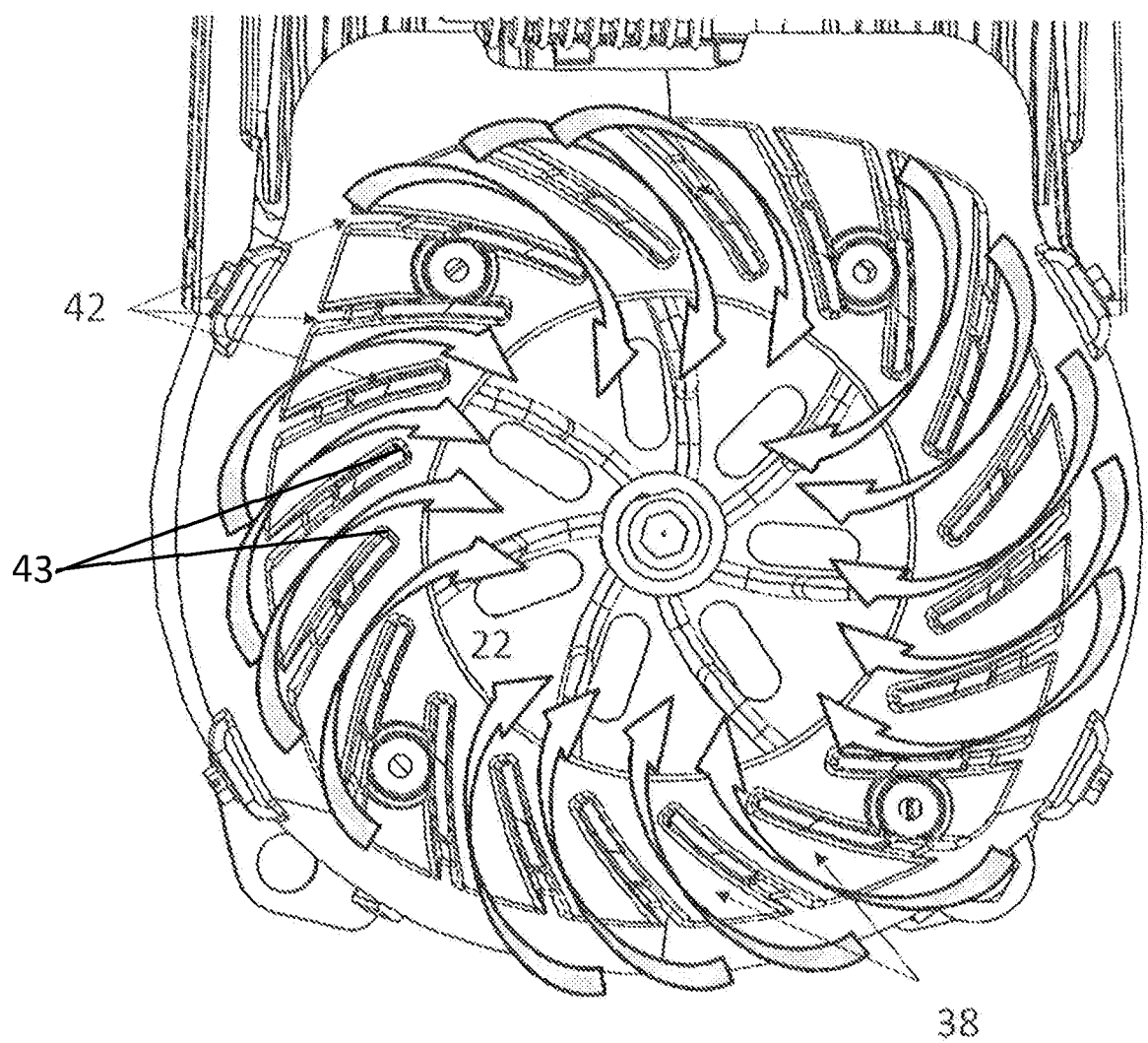
FIGS. 3-5 are rear elevational, partially cut-away views of the housing of FIG. 1.
Figure 4:
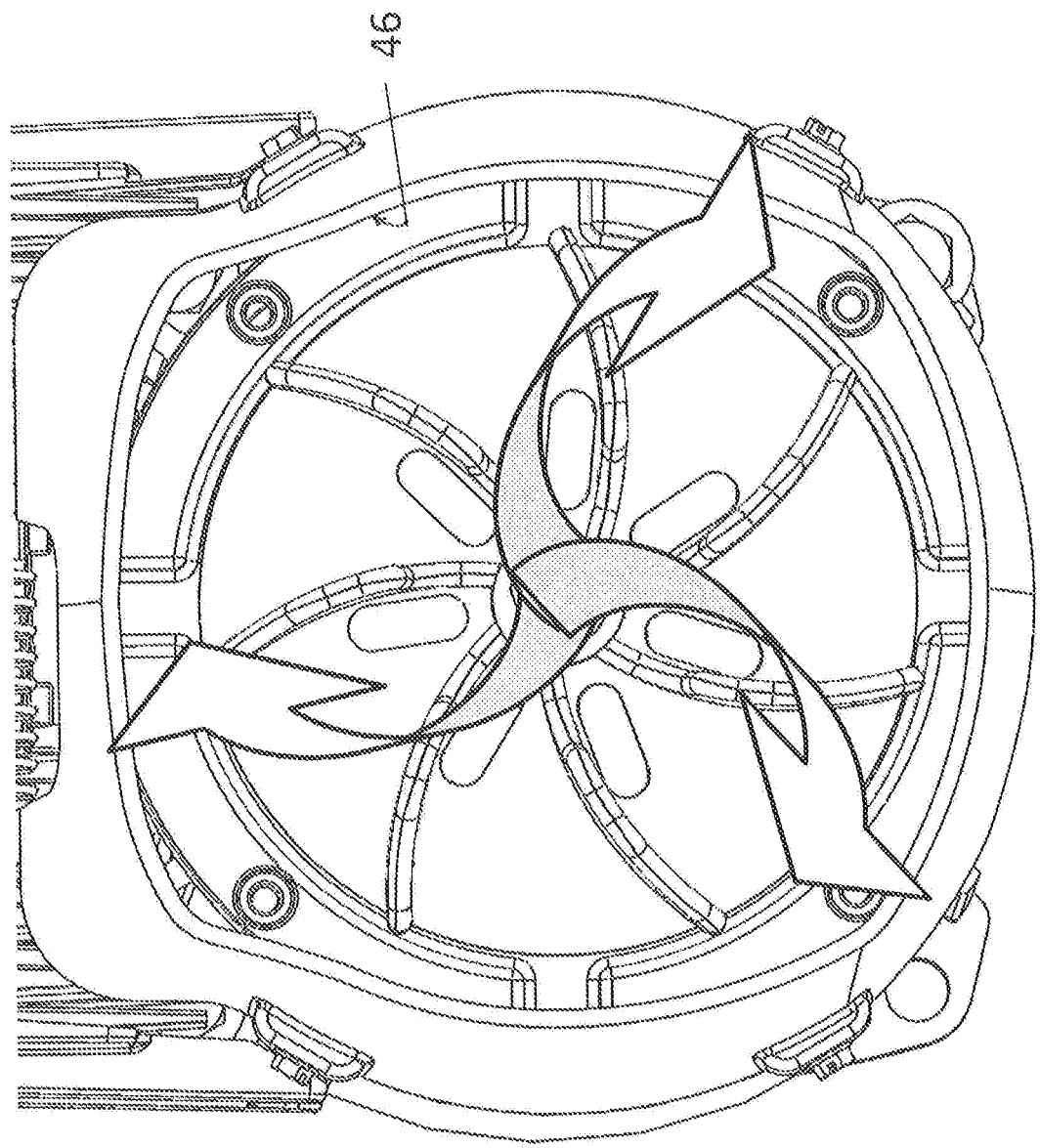

After entering inlets 38, air is channeled by vanes 42 within shroud 10 to the inlet of fan 22 (FIG. 3). Each vane 42 has an innermost end 43. As shown in FIG. 4, fan 22 spins the air against interior surfaces 46 of shroud 10 (or of a separate fan cowl if present). The air then exits axially from shroud 10, with a portion of the air exiting along the housing 14 (see arrows B of FIG. 5) and a portion of the air exiting past guide ribs 1 and 2 (see arrows C) and across fins of a heat sink for the motor drive.

Figure 7:
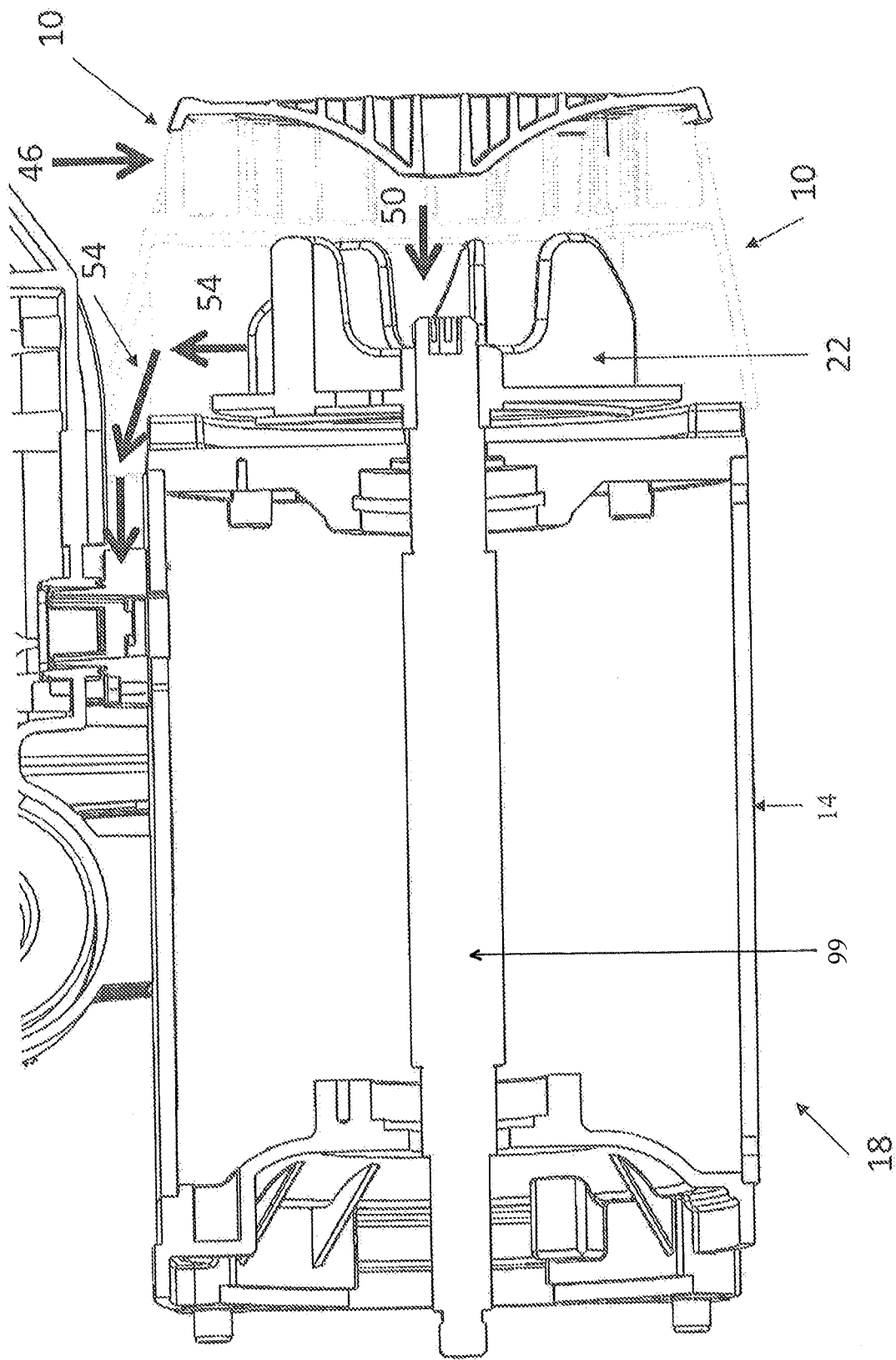
FIG. 7 is a side elevational, cross-sectional view of the housing of FIG. 1.

FIG. 7 supplies another view of air flow in connection with shroud 10. Arrow 46 (which is an example of arrow A of FIG. 2) illustrates air entering generally radially through sides 34—rather than wholly or predominantly axially through rear surface 26—of shroud 10. Arrow 50 shows this air then travelling to fan 22, which redirects the air through channels as evidenced by arrows 54 (similar to arrows B and C of FIG. 5). These torturous air-flow paths help reduce noise as the air moves to, through, and past fan 22.

Also shown in FIG. 7 is shaft 99 of the motor. As depicted in FIG. 7, shaft 99 may be connected to fan 22 so that both the shaft 99 and the fan 22 rotate about the same axis. FIG. 1 details a plate 98 positioned between inlets 38 and fan 22 and through which air may flow. As illustrated in FIG. 1, plate 98 may have a generally annular shape.

The foregoing is provided for purposes of illustrating, explaining, and describing embodiments of the present invention. Modifications and adaptations to these embodiments will be apparent to those skilled in the art and may be made without departing from the scope or spirit of the invention. Also, although "swimming pool" and "spa" are sometimes used separately, any reference to "swimming pool" or "pool" herein may include a spa, hot tub, or other vessel in which water is placed for swimming, bathing, therapy, or recreation. Finally, descriptive text originally appearing as part of the drawings of the Provisional Application includes:

FIG. 2: Instead of traditionally entering the back. This enters around the sides.

FIG. 3: The inlet air moves through the housing vanes and to the inlet of the fan.

FIG. 4: The fan spins the air against the inside of the fan housing.

Figure 5:
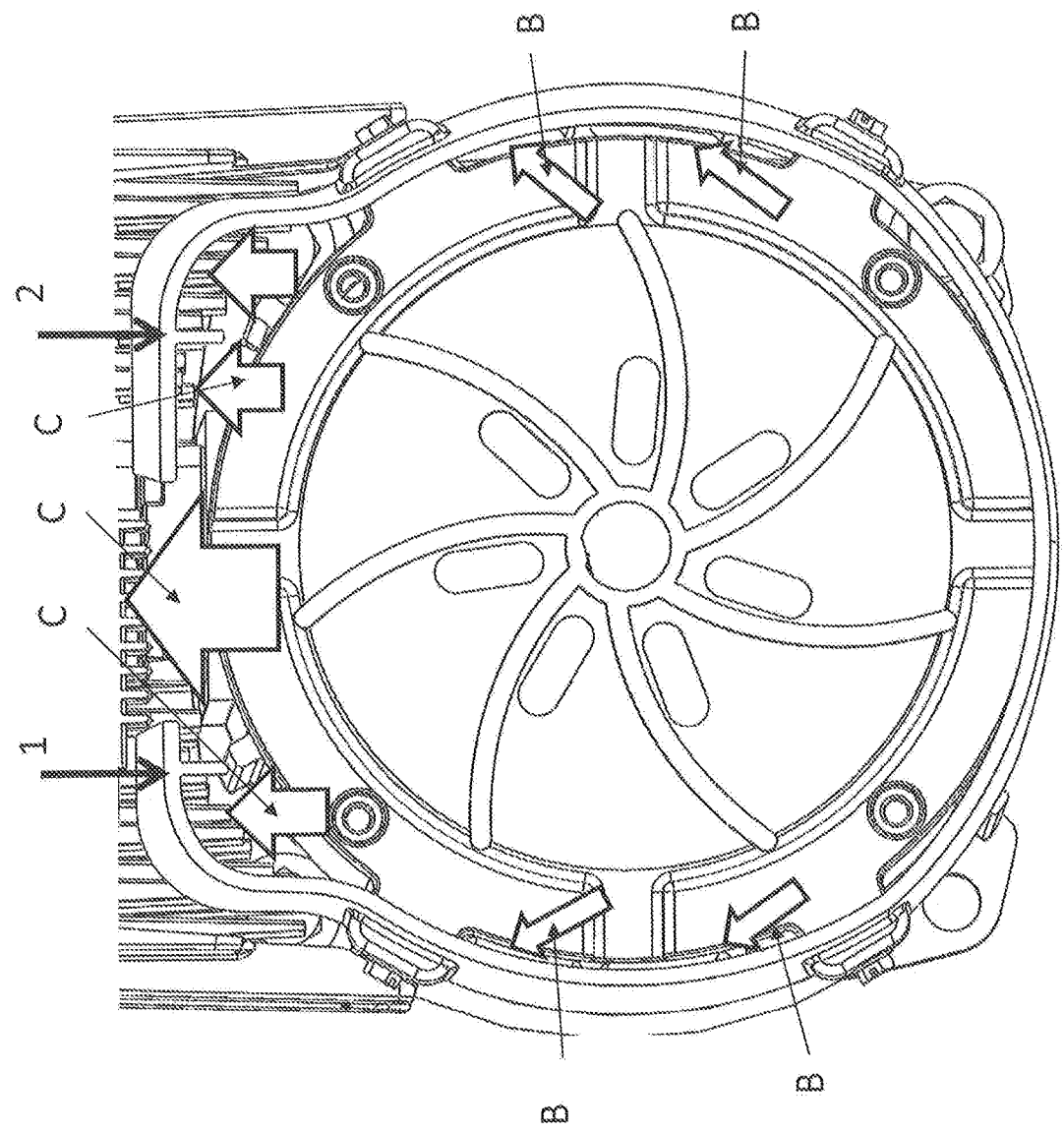

FIG. 5: The air exits the fan cowl axially down the motor extrusion channels on the sides, down the two guide ribs (1 and 2) in the fan cover, and down across the drive heat sink fins.

What is claimed is:

1. An assembly comprising:
   a. a shroud forming at least a portion of a housing of the assembly, wherein the shroud comprises:
      (i) an end;
      (ii) a sidewall; and
      (iii) a plurality of air inlets in the sidewall,
      wherein the sidewall defines a periphery of the shroud,
      wherein the end and the sidewall comprise an interior surface and an exterior surface, and
      wherein each air inlet of the plurality of air inlets comprises an aperture defined in a portion of the sidewall and an elongated vane extending inwards from the portion of the sidewall defining the aperture, wherein the vane for each air inlet comprises an innermost end that is offset circumferentially and radially inwards from the portion of the sidewall that the vane extends from such that the vane defines a non-linear, tortuous path relative to an axis of the shroud;
   b. a motor contained within the housing and comprising a shaft configured to rotate about the axis; and
   c. a cooling fan (i) positioned within the shroud and (ii) configured to rotate about the axis; and in which air is sequentially (i) drawn radially through the apertures of the air inlets by operation of the cooling fan, (ii) spun by the fan against the interior surface of the shroud, and (iii) exited axially from the shroud along the outer surface of the housing.

2. An assembly according to claim 1 in which the shaft is connected to the cooling fan.

3. An assembly according to claim 1 in which the shroud further comprises a plate positioned between the air inlets and the cooling fan.

4. An assembly according to claim 3 in which the end of the shroud further has a rear surface and in which the air inlets defined by the periphery extend substantially between the rear surface and the plate.

5. An assembly according to claim 4 in which the rear surface omits any openings through which air flows.

6. An assembly according to claim 1 further comprising guide ribs past which the air drawn radially into the shroud travels, with the guide ribs configured to cause the air to exit axially from the shroud.

7. An assembly according to claim 1 in which the vanes are curved.

8. The assembly of claim 1, wherein each vane of the plurality of vanes is elongated as the vane extends inwards from the interior surface of the sidewall of the shroud and towards the axis.

9. The assembly of claim 8, wherein each air inlet of the plurality of air inlets comprises the aperture defined in the sidewall and an elongated channel defined by adjacent vanes.

10. An assembly comprising:
    a. a housing having an outer surface, at least a portion of the housing being formed by a shroud having:
       (i) an interior surface;
       (ii) a periphery surface;
       (iii) a plurality of air inlets; and
       (iv) a plurality of vanes extending inwards from the interior surface of the shroud,
       wherein each air inlet of the plurality of air inlets comprises (i) an aperture defined in the shroud and extending from the periphery surface to the interior surface and (ii) an elongated channel defined by adjacent vanes, wherein each vane of the plurality of vanes is elongated as the vane extends inwards from the interior surface of the shroud and from an adjacent air inlet;
    b. a motor contained within the housing and comprising a shaft configured to rotate about an axis, wherein each vane of the plurality of vanes is elongated as the vane extends inwards towards the axis; and
    c. a cooling fan (i) positioned within the shroud and (ii) configured to rotate about the axis; and in which air is sequentially (i) drawn radially through the apertures of the plurality of air inlets by operation of the cooling fan, (ii) spun by the fan against the interior surface of the shroud, and (iii) exited axially from the shroud along the outer surface of the housing.

11. The assembly of claim 10, wherein the vanes are elongated in a radial direction relative to the axis.

\* \* \* \* \*